(12) United States Patent
Gao et al.

(10) Patent No.: US 9,317,177 B2
(45) Date of Patent: Apr. 19, 2016

(54) CAUSING ELEMENTS TO BE DISPLAYED

(75) Inventors: Fiona Gao, Beijing (CN); Mikko Juhani Peltola, Beijing (CN); Julie Yan, Beijing (CN); Jenny Xiong, Beijing (CN); Alan Wang, Beijing (CN); Alex Yu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/369,745

(22) PCT Filed: Dec. 31, 2011

(86) PCT No.: PCT/CN2011/085161
§ 371 (c)(1),
(2), (4) Date: Jun. 30, 2014

(87) PCT Pub. No.: WO2013/097227
PCT Pub. Date: Jul. 4, 2013

(65) Prior Publication Data
US 2014/0365893 A1 Dec. 11, 2014

(51) Int. Cl.
*G06F 3/0481* (2013.01)
*G06F 3/0488* (2013.01)
*G06F 3/0484* (2013.01)
*H04N 5/232* (2006.01)

(52) U.S. Cl.
CPC .......... *G06F 3/04817* (2013.01); *G06F 3/0488* (2013.01); *G06F 3/04842* (2013.01); *G06F 3/04847* (2013.01); *H04N 5/23216* (2013.01)

(58) Field of Classification Search
CPC ..... G06F 3/016; G06F 3/0482; G06F 3/0488; G11B 27/034
See application file for complete search history.

(56) References Cited

U.S. PATENT DOCUMENTS

| 5,635,982 | A  | * | 6/1997  | Zhang et al.       | 348/231.99 |
|-----------|----|---|---------|--------------------|------------|
| 6,393,054 | B1 | * | 5/2002  | Altunbasak et al.  | 375/240    |
| 6,549,643 | B1 | * | 4/2003  | Toklu et al.       | 382/107    |
| 6,662,244 | B1 | * | 12/2003 | Takahashi          | 710/14     |
| 7,184,100 | B1 | * | 2/2007  | Wilf et al.        | 348/700    |
| 7,810,048 | B2 | * | 10/2010 | Lee                | 715/817    |
| 8,797,273 | B2 | * | 8/2014  | Mohebbi            | 345/173    |

(Continued)

FOREIGN PATENT DOCUMENTS

| CN | 1458565   | A  | 11/2003 |
| CN | 101907970 | A  | 12/2010 |
| EP | 2278447   | A1 | 1/2011  |

OTHER PUBLICATIONS

Extended European Search Report received in European Application No. 11879034.4, dated Sep. 8, 2014, 6 pages.

(Continued)

*Primary Examiner* — Phenuel Salomon
(74) *Attorney, Agent, or Firm* — Harrington & Smith

(57) ABSTRACT

Apparatus, the apparatus having at least one processor and at least one memory having computer-readable code stored therein which when executed controls the at least one processor to perform a method comprising: causing a first element to be displayed, the first element associated with content; in response to an input in relation to the first element, causing a plurality of second elements to be displayed, each second element associated with one of a plurality of parts of the content, wherein the number of second elements is dependent upon a property of the input; and, in response to an input in relation to one or more of the plurality of second elements, carrying out an action.

15 Claims, 6 Drawing Sheets

(56) References Cited

U.S. PATENT DOCUMENTS

| | | | |
|---|---|---|---|
| 8,850,487 B2* | 9/2014 | Kang | H04N 21/4828 709/219 |
| 2002/0094846 A1* | 7/2002 | Kishimoto et al. | 455/566 |
| 2003/0023758 A1* | 1/2003 | Yoshikawa | G06F 3/14 709/247 |
| 2003/0058279 A1* | 3/2003 | Yamamoto | G03G 15/502 715/771 |
| 2003/0117440 A1* | 6/2003 | Hellyar et al. | 345/767 |
| 2004/0095395 A1* | 5/2004 | Kurtenbach | 345/810 |
| 2004/0212617 A1* | 10/2004 | Fitzmaurice et al. | 345/440 |
| 2005/0008198 A1* | 1/2005 | Guo et al. | 382/115 |
| 2005/0058431 A1* | 3/2005 | Jia et al. | 386/69 |
| 2005/0204301 A1* | 9/2005 | Keely et al. | 715/768 |
| 2006/0171525 A1* | 8/2006 | Kusaka et al. | 379/355.09 |
| 2006/0256131 A1* | 11/2006 | Trepess | 345/619 |
| 2007/0263128 A1* | 11/2007 | Zhang | 348/700 |
| 2008/0062141 A1* | 3/2008 | Chandhri | 345/173 |
| 2008/0074399 A1* | 3/2008 | Lee | 345/173 |
| 2008/0150903 A1* | 6/2008 | Chuang | 345/173 |
| 2008/0152298 A1 | 6/2008 | Ubillos | |
| 2009/0002335 A1* | 1/2009 | Chaudhri | 345/173 |
| 2009/0066838 A1* | 3/2009 | Kasutani | 348/564 |
| 2009/0132279 A1* | 5/2009 | Yeluri | G06F 17/30277 705/3 |
| 2010/0175032 A1* | 7/2010 | Ishiwata | 715/853 |
| 2010/0182248 A1* | 7/2010 | Chun | 345/173 |
| 2011/0016390 A1* | 1/2011 | Oh et al. | 715/702 |
| 2012/0105331 A1* | 5/2012 | Nomoto | G06F 3/041 345/169 |

OTHER PUBLICATIONS

International Search Report and Written Opinion received in Patent Cooperation Treaty Application No. PCT/CN2011/085161, dated Oct. 4, 2012, 7 pages.

Office Action received in European Application No. 11879034.4, dated Jul. 1, 2015, 7 pages.

* cited by examiner

CAUSING ELEMENTS TO BE DISPLAYED

RELATED APPLICATION

This application was originally filed as Patent Cooperation Treaty Application No. PCT/CN2011/085161 filed Dec. 31, 2011.

FIELD

The invention relates to a method, apparatus and computer program for causing elements to be displayed, particularly elements associated with parts of content.

BACKGROUND

It is known for electronic devices such as mobile telephones, smartphones, personal digital assistants, tablet and laptop computers to include a camera for capturing photos and videos. The captured photos and videos, as well as other content, can be browsed, viewed and, in some instances, edited using the device. However, applications for carrying out these action are often not particularly easy to use.

SUMMARY

According to a first aspect of the invention, there is provided apparatus, the apparatus having at least one processor and at least one memory having computer-readable code stored therein which when executed controls the at least one processor to perform a method comprising: causing a first element to be displayed, the first element associated with content; in response to an input in relation to the first element, causing a plurality of second elements to be displayed, each second element associated with one of a plurality of parts of the content, wherein the number of second elements is dependent upon a property of the input; and, in response to an input in relation to one or more of the plurality of second elements, carrying out an action.

The input may comprise a sliding input and causing the plurality of second elements to be displayed may comprise causing the number of second elements to increase as the length of the sliding input along a defined path increases.

The computer-readable code when executed may control the at least one processor to perform determining the plurality of parts of the content based upon one or more characteristics of the content.

Causing the plurality of second elements to be displayed may comprises causing the second elements to be displayed along a defined path, wherein the order of the second elements on the path corresponds to an order of the associated parts of the content. The path may comprise a plurality of parts, each part being arranged along a first direction and each part except the first part being offset from the preceding part in a second direction perpendicular to the first direction.

The plurality of parts associated with the displayed second elements may together constitute the content.

Causing the plurality of second elements to be displayed may comprise causing the number of second elements to increase successively and the computer-readable code when executed may control the at least one processor to perform: determining a next second element to be displayed by determining a next division of the content based upon one or more characteristics of the content; and displaying the next second element in an appropriate position in relation to the other displayed second elements.

The computer-readable code when executed may control the at least one processor to perform causing the first element to move along a defined path in accordance with the input in relation to the first element.

The computer-readable code when executed may control the at least one processor to perform, in response to a further input in relation to one of the plurality of second elements, causing a plurality of further second elements to be displayed, each further second element associated with one of a plurality of subparts of the part of the content which is associated with the second element, wherein the number of further second elements is dependent upon a property of the further input in relation to the second element.

Carrying out the action may comprise: selecting one or more of the plurality of second elements; and generating further content consisting of the parts associated with the selected one or more second elements.

The content may comprise a video.

According to a second aspect of the invention, there is provided a computer implemented method comprising: causing a first element to be displayed, the first element associated with content; in response to an input in relation to the first element, causing a plurality of second elements to be displayed, each second element associated with one of a plurality of parts of the content, wherein the number of second elements is dependent upon a property of the input; and, in response to an input in relation to one or more of the plurality of second elements, carrying out an action.

The input may comprise a sliding input and causing the plurality of second elements to be displayed may comprise causing the number of second elements to increase as the length of the sliding input along a defined path increases.

The method may comprise determining the plurality of parts of the content based upon one or more characteristics of the content.

Causing the plurality of second elements to be displayed may comprise causing the second elements to be displayed along a defined path, wherein the order of the second elements on the path corresponds to an order of the associated parts of the content. The path may comprise a plurality of parts, each part being arranged along a first direction and each part except the first part being offset from the preceding part in a second direction perpendicular to the first direction.

The plurality of parts associated with the displayed second elements may together constitute the content.

Causing the plurality of second elements to be displayed may comprise causing the number of second elements to increase successively and the method may comprise: determining a next second element to be displayed by determining the next most important dividing point in the content based upon one or more characteristics of the content; and displaying the next second element in an appropriate position in relation to the other displayed second elements.

The method may comprise, causing the first element to move along a defined path in accordance with the input in relation to the first element.

The method may comprise, in response to a further input in relation to one of the plurality of second elements, causing a plurality of further second elements to be displayed, each further second element associated with one of a plurality of subparts of the part of the content which is associated with the second element, wherein the number of further second elements is dependent upon a property of the further input in relation to the second element.

Carrying out the action may comprise: selecting one or more of the plurality of second elements; and generating further content consisting of the parts associated with the selected one or more second elements.

The content may comprise a video.

According to a third aspect of the invention, there is provided a computer program comprising instructions that when executed by computer apparatus control it to perform the method.

According to a fourth aspect of the invention, there is provided apparatus comprising: means for causing a first element to be displayed, the first element associated with content; means, responsive to an input in relation to the first element, for causing a plurality of second elements to be displayed, each second element associated with one of a plurality of parts of the content, wherein the number of second elements is dependent upon a property of the input; and means, responsive to an input in relation to one or more of the plurality of second elements, for carrying out an action.

According to a fifth aspect of the invention, there is provided a non-transitory computer-readable storage medium having stored thereon computer-readable code, which, when executed by computing apparatus, causes the computing apparatus to perform a method comprising: causing a first element to be displayed, the first element associated with content; in response to an input in relation to the first element, causing a plurality of second elements to be displayed, each second element associated with one of a plurality of parts of the content, wherein the number of second elements is dependent upon a property of the input; and, in response to an input in relation to one or more of the plurality of second elements, carrying out an action.

BRIEF DESCRIPTION OF THE DRAWINGS

Embodiments of the present invention will now be described, by way of example only, with reference to the accompanying drawings, in which.

DETAILED DESCRIPTION OF EMBODIMENTS

Figure 1:
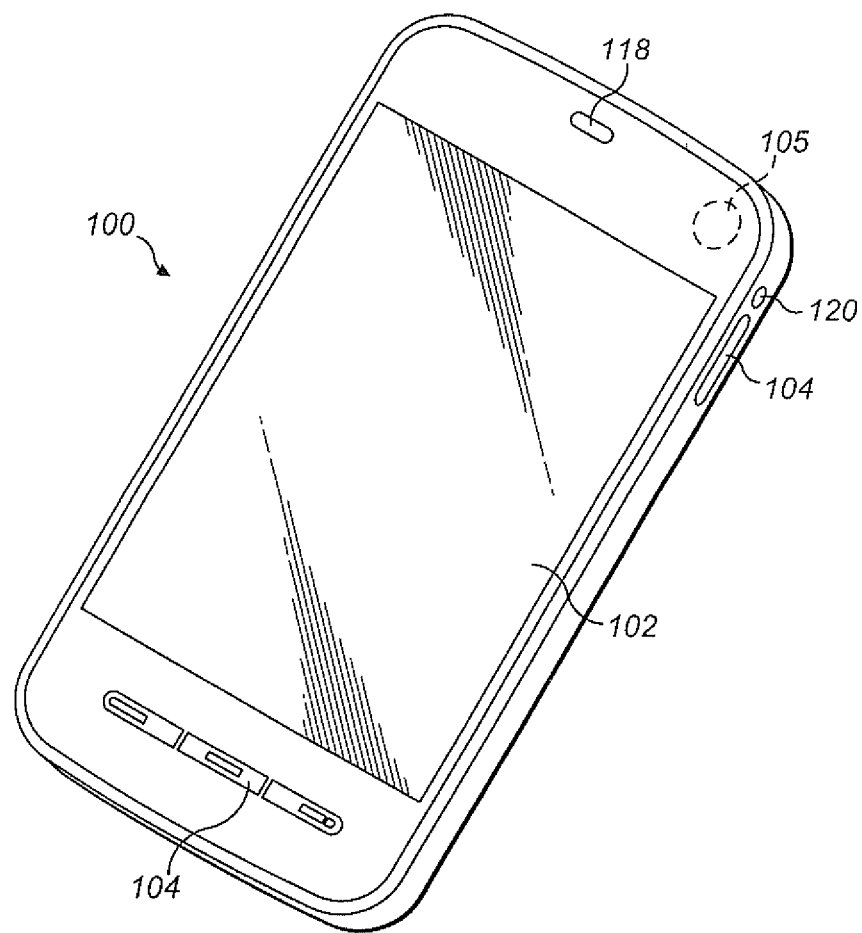
FIG. 1 is a perspective view of a mobile terminal embodying aspects of the invention.

In the description and the drawings, like reference numerals refer to like elements throughout.

Referring firstly to FIG. 1, a terminal 100 is shown. The exterior of the terminal 100 has a touch sensitive display 102, hardware keys 104, a rear-facing camera 105, a speaker 118 and a headphone port 120. The terminal 100 here is a monobody touchscreen smartphone, of which the Nokia N9™ is an example.

Figure 2:
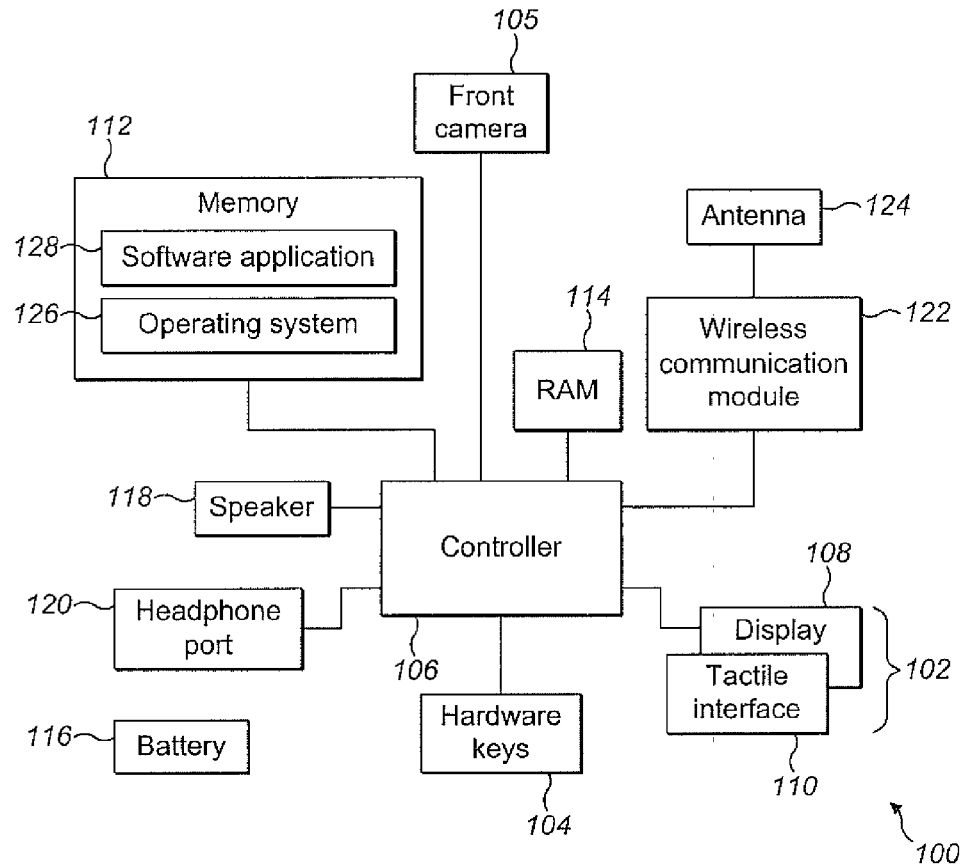
FIG. 2 is a schematic diagram illustrating components of the mobile terminal of FIG. 1 and their interconnection.

FIG. 2 is a schematic diagram of the components of the terminal 100. The terminal 100 has a controller 106. The terminal 100 also has a display 102. The display 102 is a touch sensitive display 102 comprised of a display part 108 and a tactile interface part 110. The terminal 100 has hardware keys 104. The terminal 100 has a camera 105. The terminal 100 has a memory 112. The terminal 100 has RAM 114. The terminal 100 has a speaker 118. The terminal 100 has a headphone port 120. The terminal 100 has a wireless communication module 122. The terminal 100 has an antenna 124. The terminal 100 has a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores an operating system 126. The operating system 126 includes a kernel and plural modules (not shown). The operating system for instance may be the Symbian™ operating system provided by the Symbian Foundation or the Windows Phone™ operating system provided by Microsoft Corporation. The memory 112 also stores one or more software applications 128. The RAM 114 is used by the controller 106 for the temporary storage of data. The operating system 126 may contain code which, when executed by the controller 106 in conjunction with RAM 114, controls operation of each of the hardware components of the terminal 100. The RAM 114 and the memory 112 may be separate memories or they may be different parts of the same memory.

The controller 106 may take any suitable form. For instance, it may be processing means comprising a microcontroller, plural microcontrollers, a single-core processor, plural processors or a multi-core processor such as a dual-core processor or a quad-core processor.

The terminal 100 may be a mobile telephone or smartphone, a personal digital assistant (PDA), a portable media player (PMP), a portable computer or any other device capable of running software applications and providing display outputs. The terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 may be configured to display images and text to users of the terminal 100 based on instructions provided by the controller 106. The tactile interface part 110 is for receiving touch inputs from users and for indicating to the controller 106 what inputs have been received.

As well as storing the operating system 126 and software applications 128, the memory 112 may also store media files such as photograph, video and music files. A wide variety of software applications 128 may be installed on the terminal 100 including web browsers, radio and music players, games and utility applications.

In some embodiments the terminal 100 may also be associated with external software applications not stored on the terminal 100. These may be applications stored on a remote server device and may run partly or exclusively on the remote server device. These applications can be termed cloud-hosted applications. The terminal 100 may be in communication with the remote server device in order to utilise the software applications stored there.

The hardware keys 104 may include a camera operation key. The camera operation key may trigger the capture of photographs using the camera 105. The camera operation key may also cause a camera application 130 (FIG. 3), being one of the software applications 128, to be opened or executed. In this way, a user can prepare the device 100 to capture photographs or video simply by activating the camera operation key. Activation of the camera application 130 may require a long press or hold of the camera operation key. The camera operation key may be configured to focus the camera 105 when the key is held by the user half-depressed.

In some embodiments, the hardware keys 104 include dedicated volume control keys or switches. The hardware keys may for example include two adjacent keys, a single rocker switch or a rotary dial. The hardware keys 104 may be located on the side of the terminal 100.

Briefly, the terminal 100 may be configured to display a first element, e.g. an icon 151 (see FIG. 5), associated with content. The content is preferably a video or a set of photos or images. The terminal 100 may be further configured, in response to an input in relation to the icon 151, to display a plurality of second elements 155 (see FIG. 5) associated with respective parts of the content. The second elements 155 will be referred to in the following as 'key frames' (if the content is a video) or 'key images' (if the content is a set of photos or images). The parts preferably comprise parts of the video, e.g. particular scenes, or sub-sets of the set of images, e.g. images with particular characteristics in common. The parts may comprise single video frames or single images. The number of key frames/images 155 depends upon a property of the input such as the length of a sliding touch input. The terminal 100 may be further configured, in response to an input in relation to one or more of the key frames/images 155, to perform an action, e.g. to edit the content or parts of it.

Figure 3:
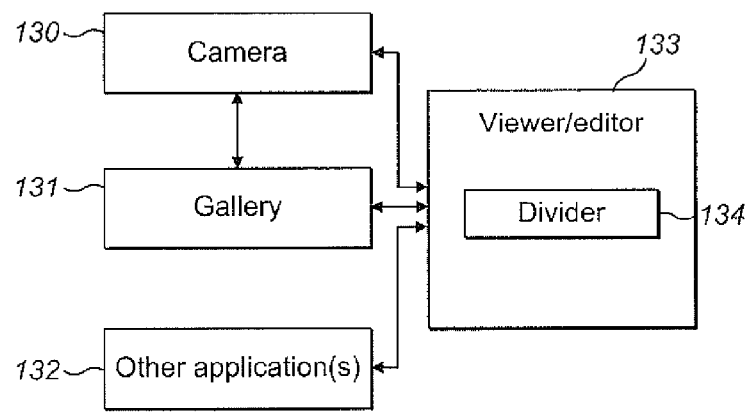
FIG. 3 is a schematic diagram illustrating functional components of a viewing and/or editing feature provided by the mobile terminal of FIGS. 1 and 2.

Referring to FIG. 3, there are shown various software applications and modules which may be stored in the memory 112. These include the camera application 130, a gallery application 131, one or more other software applications 132 and a viewing/editing module 133.

The camera application 130 may allow the user to capture photos and videos. The camera application 130 may cause the direct output from the camera 105 to be displayed on the display 102 such that the display 102 acts as a viewfinder. With the camera application 130, the user may be able to perform actions such as switching between photo and video capture modes, changing capture settings, focusing, setting the zoom level, and capturing photos and videos. The camera application 130 may store captured photos and videos in the memory 112. The camera application 130 may also cause the most recently captured photos and videos to be displayed and may provide options for the user to perform various actions in relation to the photos and videos. For example, the user may share the photos and videos via a choice of communication means. Also, the user may select an option to view and/or edit a video or a set of photos using the viewing/editing module 133.

The gallery application 131 may allow the user to organise and view photos (or other digital images) and videos stored in the memory 112. Photos and videos may be sourced in any suitable way. Photos and videos may be captured by the camera 105. Alternatively, they may be received as files, for instance as an attachment or embedded within a message such as an email, an instant message, a multimedia message service (MMS) message or a message provided through a social network service provider such as Facebook or LinkedIn. Photos and videos may instead be hosted remotely. For instance, photos and videos may be held within a user's gallery on a service such as Ovi, Facebook or Flickr.

A plurality of photos and/or videos may be organised into groups or sets. For example, photos and videos may be associated with tags ('tagged'). A tag is preferably a keyword or some other metadata associated with one or more photos or videos. A tag may include information about the geographical location or the date and time at which the photo or video was captured. A tag may include information about the names(s) of person(s) in the photo or video. Photos and videos may be tagged in any suitable way. Tagging may be performed by the user or by the terminal 100 or by another entity. Alternatively or additionally, photos and/or videos may be grouped together by placing them in folders or subfolders. The folders may be associated with the file system used to store the photos and/or videos in the memory 112 or they may be virtual folders. Alternatively or additionally, the terminal 100 may group together photos which have been captured by the camera 105 operating in a burst mode, e.g. when several photos are captured in quick succession in response to a single input.

The gallery application 131 may provide options for the user to select photos, videos and/or groups or sets thereof and perform various related actions. For example, the user may share selected photos and/or video via a choice of communication means. Also, the user may select an option to view and/or edit a selected video or a selected set of photos using the viewing/editing module 133.

The viewing/editing module 133 may provide a way for the user to view and/or edit content. The content is preferably a video. The content may also be a set of photos or images (referred to in the following as 'images'). The viewing/editing module 133 preferably operates in conjunction with the camera application 130 or the gallery application 131. The viewing/editing module 133 may also be accessible from one or more other software applications 132, such as a web browser or an email or messaging application. In such cases, the content to be viewed and/or edited is selected in or by the application 131, 132, 133. The viewing/editing module 133 may also operate as a stand-alone application. In such a case, the viewing/editing module 133 preferably provides a way for the user to select the content to be viewed and/or edited.

As will be described in more detail below, the viewing/editing module 133 may be configured to divide the content into a number of parts, each of which is associated with, and represented on the display 102 by, a respective element, for example a key frame/image 155 (see FIG. 5). In the case of a video, the key frame 155 may include the first video frame of the associated part of the video. In the case of a set of images, the key image 155 may include one or more of the images in the sub-set of images. Alternatively or additionally, the key frame/image 155 may comprise text. The user may control the number of parts and hence the number of key frames/images 155 which are displayed by making a suitable input, such as dragging the icon 151 (see FIG. 5) across the display 102. Various actions may then be performed. These actions include, for example, editing the content or parts of it. For instance, one or more of the displayed key frames/images 155 can be selected and a new video or a new set of images produced including only the parts associated with the selected key frames/images 155. Also, for instance, the part of the content associated with one of the displayed key frames/images 155, e.g. one or more video frames or images, can be edited.

A dividing module 134 preferably forms part of the viewing/editing module 133. The dividing module 134 may be configured to analyse the content and to provide information about how the content is to be divided into parts and/or about the key frames/images 155 (see FIG. 5) to be displayed. This information may be used by the viewing/editing module 133 when displaying the key frames/images 155 and also when performing other operations.

If the content is a video, then the dividing module 134 is preferably configured to divide the video into parts in such a way that the different parts correspond to different shots or scenes in the video, different periods during which particular objects or peoples are in the shot, and so on. In order to do so, the dividing module 134 may analyse the differences between the different frames of the video. This analysis may be performed in any suitable way.

For example, the dividing module 134 may determine one or more parameters associated with each frame and then compare these parameters for pairs of consecutive or nearby frames in order to determine a score representing the degree of difference between each pair of frames. If the video is encoded, for example using Moving Picture Experts Group-4 (MPEG-4) encoding, then the determination is preferably based upon one or more of the encoding parameters (rather than the decoded images). Thus, the determination may be performed relatively quickly.

Each pair of frames may represent a potential dividing point for the video. The importance or prominence of each potential dividing point may depend upon the associated score. So that the video can be appropriately divided into a specified number of parts, the pairs of frames may be ordered according to the associated scores. Pairs of frames for which the associated scores do not reliably represent a potential dividing point, for example scores below a certain threshold value, may be ignored. This threshold value may be fixed or may be adapted to the video being divided. Alternatively or additionally, there may be a maximum number of potential dividing points and hence a maximum number of parts into which the video can be divided. The maximum number of parts may be pre-set, for example at a number between 10 and 100 depending upon the capabilities of the terminal 100. The number may also be changeable by the user.

Information relating to the potential dividing points of the video may be stored in memory 112 or 114. An image corresponding to the frame after the potential dividing point, e.g. the second of the pair of frames, may also be stored together with the information. This image may then be used as a key frame 155 (see FIG. 5). Alternatively, the terminal 100 may generate such an image when it is needed.

If the content is a set of images, then the dividing module 134 may divide the set of images in various different ways.

For example, the set of images may be divided based upon the visual content of the images. The set of images may be divided in such a way that each part or sub-set of images contains similar images, for example images having similar backgrounds and/or foregrounds. The dividing may be performed in any suitable way. For example, the dividing module 134 may analyse the image data and determine one or more parameters associated with each image. Cluster analysis may then be performed using a suitable algorithm. The cluster analysis may be performed in order to generate a series of 'divisions', wherein the set of images is divided into a different number of sub-sets in each division. The first division may consist of two sub-sets, the second division may consist of three sub-sets, and so on.

Alternatively or additionally, the set of images may be divided based upon characteristics of the images other than their visual content. For example, the set of images may be divided based upon one or more tags such as keywords, geographical location, date, time and/or name. Alternatively or additionally, the set of images may be divided based upon the folders into which the images have been placed. The dividing may be performed in any suitable way. For example, the set of images may be ordered in dependence upon the characteristics being used to divide them. If the characteristics comprise text, e.g. keywords, then the images may be ordered alphabetically by keyword. If the characteristics comprise numbers or times and dates, then they may be ordered numerically or temporally. The ordered set of images may then be divided appropriately. The dividing module 132 may generate a series of 'divisions', wherein the set of images is divided into a different number of sub-sets in each division. For example, a first division may consist of a first sub-set of images tagged with a keyword beginning with one of the letters 'A' to 'M' and a second sub-set of images tagged with a keyword beginning, with one of the letters 'N' to 'Z'. A second division may consist of three subsets corresponding respectively to 'A to 'I', 'J' to 'R', 'S' to 'Z'. As another example, a first division may consist of two subsets corresponding respectively to images dated 'today' and 'earlier', a second division may consist of three subsets corresponding respectively to 'today', 'this month' and 'earlier', and so on.

In such cases, information relating to the divisions of the set of images may be stored in memory 112 or 114. Images associated with each' of the sub-sets may also be stored together with the information. These images may then be used as key images 155 (see FIG. 5). If the images are ordered in some way, then each key image 155 is preferably the first image in each sub-set.

In some embodiments, the set of images may be divided based upon one characteristic and then another, e.g. based upon keyword and then time and date.

If the set of images is to be divided based upon both their visual content and their time and/or date, then this may be performed in a similar manner to dividing a video, as described above.

An example method of operation of the terminal 100 will now be described with reference to the flow chart of FIG. 4. The steps of this figure may be performed by one or more of the software applications 128, 130, 131, 132 and modules 133, 134 shown in FIGS. 2 and 3.

The operation of FIG. 4 will be described with some reference to FIGS. 5*a* to 5*d*, and afterwards FIGS. 5*a* to 5*d* will be described with reference to FIG. 4.

At step S1, the operation starts. As described above, this is preferably in response to the user having selected an option to edit a selected video or a selected set of images in the camera application 130, gallery application 131 or other application(s) 132. In the following, the selected content will be referred to as 'the content'.

In some embodiments, the terminal 100 may provide the user with an option to select a part of the content to be viewed and/or edited, for example to select a particular start and end time of the video.

At step S2, an icon 151 associated with the content is displayed. The icon 151 is included in the screenshot 150 shown in FIG. 5*a*. The screenshot 150 also includes buttons labelled 'exit' 152 and 'options' 153, which will be described below.

At step S3, the dividing module 134 optionally starts to analyse the content in order to determine the potential dividing points or divisions as described above. Thus, this information may already be available for carrying out some of the following steps.

If the content is such that it can be divided in various different ways, then the terminal 100 may provide the user with an option to select a particular way in which the content is to be divided. In this case, the dividing module 134 may function accordingly.

At step S4, the terminal 100 determines whether the user has started to perform an input in relation to the icon 151. This input is preferably a touch input on the display 102 and, in particular, a sliding input beginning on the icon 151. In other words, the input is preferably an input to 'drag' the icon 151 across the display 102.

At step S5, in response to determining that the user has started to perform the input in relation to the icon 151, the terminal 100 causes the icon 151 to start to move across the display 102 in accordance with the input.

The movement of the icon 151 is preferably constrained such that it can only occur along a specified path. For example, the specified path may include a sequence of line segments, each of which is parallel to the top edge of the display 102 (e.g., 'horizontal') and is offset from a previous line segment in a direction perpendicular to the top edge of the display 102. In order for the icon 151 to be moved from a line to a next line, the sliding input may need to be moved diagonally from the end of the line to the beginning of the next line. Therefore, the icon 151 can be moved along several of the lines by carrying out a continuous 'zigzag' input.

The specified path may instead take a different form. For example, the specified path may include a series of 'vertical' line segments. Or, the specified path may include a looped and/or curved path.

As will be described in more detail below, key frames/images 155 are preferably displayed along the same path as that along which the icon 151 moves. For example, FIG. 5b shows a screenshot 154 in which a plurality of key frames/images 155 are displayed along a line along which the icon 151 has been moved.

The terminal 100 preferably continues to cause the icon 151 to move as long as the input in relation to the icon 151 continues.

At step S6, the terminal 100 determines whether the icon 151 has been moved forwards along the specified path by a unit of length. This unit of length preferably corresponds to the length required to accommodate an additional key frame/image 155 on the path. Thus, the unit of length preferably corresponds to the width of the key frame/image 155 plus any spacing between consecutive key frames/images 155.

At step S7, if it is determined that the icon 151 has been moved along the specified path by the unit of length, the terminal 100 determines the new key frame/image 155 to be displayed.

The first key frame/image 155 to be displayed is preferably the one associated with the whole of the content. For example, the first key frame/image 155 may include the first frame of the video or an image associated with the whole set of images.

Information provided by the dividing module 134 may be used to determine the second and subsequent key frames/images 155 to be displayed in one or more of the following ways.

If the content is a video, then the dividing point with the highest associated 'difference' score which is not already represented on the display 102 may be determined. For instance, if four key frames 155 and so three dividing points are already being displayed, then the new dividing point may be that with the fourth-highest associated score. The new key frame 155 to be displayed may be the key frame 155 associated with the part of the video immediately after the new dividing point. The key frame 155 associated with the part of the video immediately before the new dividing point is preferably unchanged since it preferably comprises the first frame in the part and this first frame is unchanged.

If the content is a set of images, then the division of the set of images having the appropriate number of sub-sets may be determined. For instance, if four key images 155 and so four sub-sets are already being displayed, then the new division may be the one having five sub-sets. Preferably, sets of images are divided in such a way that the difference between successive divisions is merely that one sub-set is divided in two. In this case, the new key image 155 to be displayed is the key image 155 associated with one of the two new subsets. If the images are ordered, then the new key image 155 to be displayed is preferably the key image 155 associated with the second of the two new subsets.

At step S8, the terminal 100 determines whether the key frames/images 155 which are already being displayed need re-positioning in order to appropriately display the new key frame/image 155. If the content is a video, then this may be the case if the new dividing point is at an earlier point in time in the video than the start point of any of the parts of the video associated with the displayed key frames 155. Similar considerations apply if the content is a set of images.

At step S9, if needed, the displayed key frames/images 155 are re-positioned. For example, the key frames 155 associated with parts of a video with later start points than the new dividing point are caused to shift along the path along which the icon 151 has been moved so as to provide a space for the new key frame/image 155 to be displayed. If necessary, the key frames/images 155 are caused to move from the end of a line to the beginning of a next line.

At steps S8 and S9, the terminal 100 may also determine whether any of the key frames/images 155 which are already being displayed need to replaced by different key frames/images 155 and, if needed, may do so. For example, if a part of the content is to be divided in two as described above, then the associated key frame/image 155 may need to be replaced with a key frame/image 155 associated with the first of the two new parts. This may be the case if, for example, the key frames/images 155 are not associated with the first frames or images of the parts of the content. In some instances, the difference between successive divisions may be such that more than one displayed key frame/image 155 may need to be replaced.

In some embodiments, the key frames/images 155 are made smaller as the number of key frames/images 155 being displayed increases (and vice versa). For example, the size of the key frames/images 155 may decrease in a series of steps as the number of key frames/images 155 exceeds a series of thresholds. These thresholds may correspond to the number of key frames/images 155 of a particular size which can fit on the display 102. At the same time, the spacings between the key frames/images may also be decreased. At a later stage, the user may be able to zoom into or out of the screen.

At step S10, the terminal 100 causes the new key frame/image 155 to be displayed at the appropriate position on the path. The new key frame/image 155 may be added to the end of the series of key frames/images 155 in the space created by the movement of the icon 151. Or, the new key frame/image may be added to the middle of the series of key frames/images 155 in the space created by the re-positioning performed at step S9. In this way the terminal 100 can display a series of key frames/images 155 wherein the positional order of the key frames/images 155 corresponds to an order of the associated parts in the content.

The newly-added key frame/image 155 may be highlighted for a period of time and/or until a further key frame/image 155 is added.

Steps S9 and S10 have been described as occurring after the icon 151 has been moved by the unit of length described above in relation to step S7. However, the re-positioning and/or replacing of the key frames/images 155 (step S9) and/or the display of the new key frame/image 155 (step S10) may occur progressively while the icon 151 is being moved. For example, in the screenshot 154 shown in FIG. 5b, three key frames/images $155_1$, $155_2$, $155_3$ are fully displayed and a fourth key frame/image $155_4$ is partially displayed. Here, the fourth key frame/image $155_4$ is being revealed as the icon 151 is being moved.

At step S11, the terminal 100 determines whether the input in relation to the icon 151 is still being performed. For example, a touch input may be considered to continue until the user lifts a finger or a stylus from the screen 102. If the input is still being performed, then the operation returns to step S5, thereafter further new key frames/images 155 may be added to the display 102.

Although not shown in the figures, while the input is being performed, the terminal 100 may determine whether the icon 151 has been moved backwards along the specified path by the above-described unit of length. If so, then the terminal 100 may remove the key frame/image 155 that was most recently added and, if needed, re-position and/or replace the other key frames/images 155. Therefore, the user may be able to add or remove key frames/images 155 to or from the display 102 by, for example, dragging the icon 151 forwards or backwards along the specified path. In this way, the user can easily control the number of displayed key frames/images 155. Moreover, the key frames/images 155 are always correctly ordered.

After the user has finished performing the input in relation to the icon 151, he/she may be able to perform various inputs in order to perform various actions.

For example, the user may be able to continue adding or removing key frames/images 155 in the same way as that described above. At step S12, the terminal 100 determines whether the user has once again started to perform the input in relation to the icon 151. In other words, step S12 is similar to step S4 described above. If the terminal 100 determines that the user has done so, then the operation returns to step S5. In some embodiments, the icon 151 is no longer displayed after the user has finished performing the input in relation to it. In this case, the user may be provided with an option to re-display the icon 151 and hence continue adding or removing key frames/images 155.

Alternatively or additionally, the user may be able to sub-divide a particular part of the content associated with a particular one of the displayed key frames/images 155.

At step S13, the terminal 100 determines whether the user has started to perform an input in relation to one of the displayed key frames/images 155. The input is preferably similar to the input which is used to move the icon 151 (see step S4). In other words, the input is preferably an input to drag the key frame/image 155 across the display 102.

At step S14, in response to determining that the user has started to perform such an input, the terminal 100 starts to perform a series of operations in order to sub-divide the part of the content associated with the key frame/image 155. This series of operations may correspond to the operations described above in relation to steps S5 to S11. However, in this case, the particular key frame/image 155 is moved instead of the icon 151. The new key frames/images 155 to be displayed may be determined as described above in relation to step S7 but, in this case, only potential dividing points or divisions which fall within the part of the content which is being sub-divided are considered. The new key frames/images 155 thus displayed may be different so as to distinguish them from the other key frames/images 155. The user may be provided with an option to select a particular way of sub-dividing the part of the content which may be different from the way previously used to divide the content. Once the user has finished sub-dividing the key frame/image 155, the operation proceeds to step S15.

Various actions can involve the user selecting one or more of the displayed key frames/images 155.

At step S15, the terminal 100 determines whether the user has performed another type of input (a 'selecting input') in relation to one of the displayed key frames/images 155. This other type of input may be any input which is different from the input used to move the key frame/image 155 (see steps S13 and S14). For example, it may involve a short touch on one of the displayed key frames/images 155.

At step S16, in response to determining that the user has performed such an input, the key frame/image 155 is changed from an unselected state to a selected state or vice versa. The key frame/image 155 may be highlighted so as to indicate that it is in the selected state. For example, in the screenshot 156 shown in FIG. 5c, four key frames/images $155_1$, $155_4$, $155_7$, $155_{10}$ have been selected and highlighted accordingly.

At step S17, the terminal 100 determines whether the user has performed an input which indicates that an action is to be performed in relation to the selected one or more key frames/images $155_1$, $155_4$, $155_7$, $155_{10}$. This input may involve selecting the 'options' icon 153 and then selecting from a displayed list of options.

At step S18, in response to determining that the user has performed such an input, the terminal 100 performs the action. For example, the user may have selected the option of generating a new video or set of images including only those parts which are associated with the selected key frames/images $155_1$, $155_4$, $155_7$, $155_{10}$.

Figure 5A:
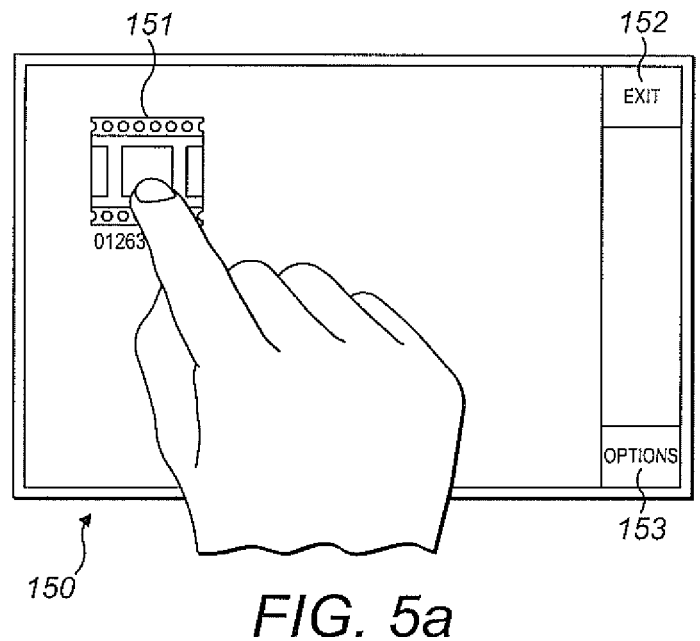
FIGS. 5a to 5d are screenshots provided by the mobile terminal of FIGS. 1 and 2 at different points in the operation of the flowchart of FIG. 4.
Figure 5B:
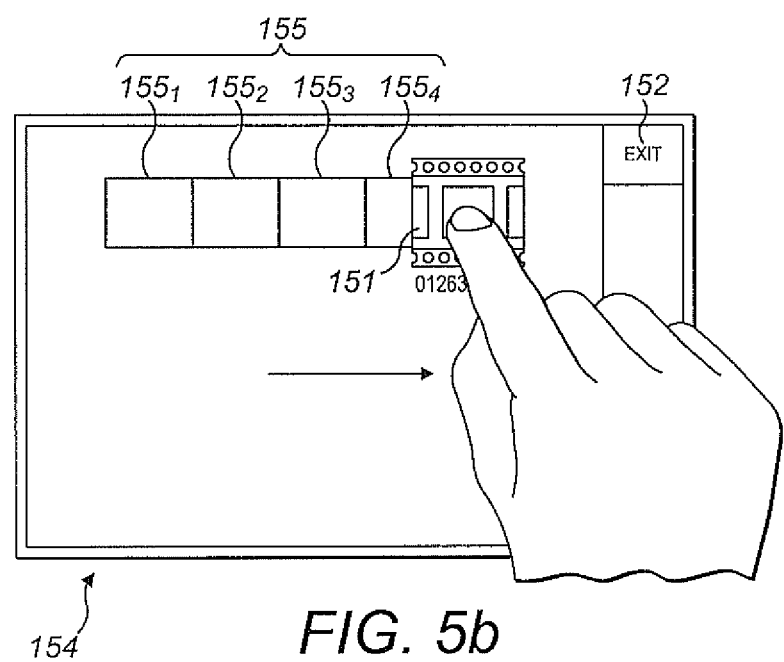
Figure 5C:
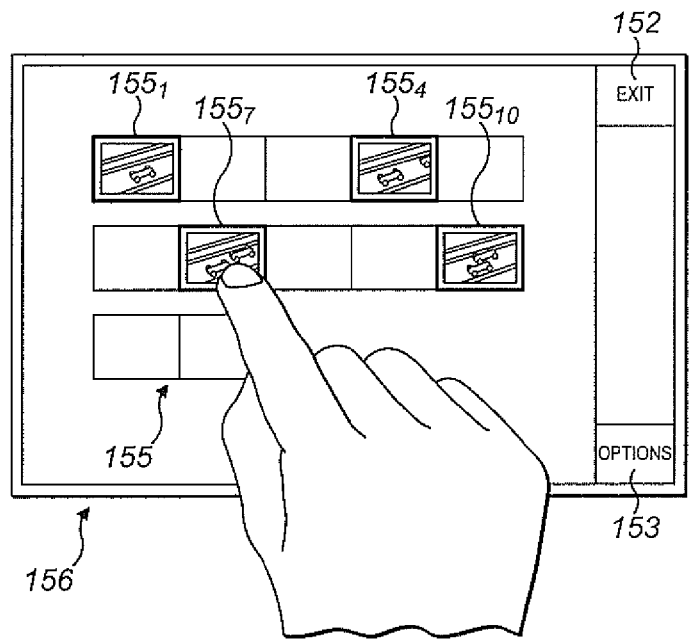
Figure 5D:
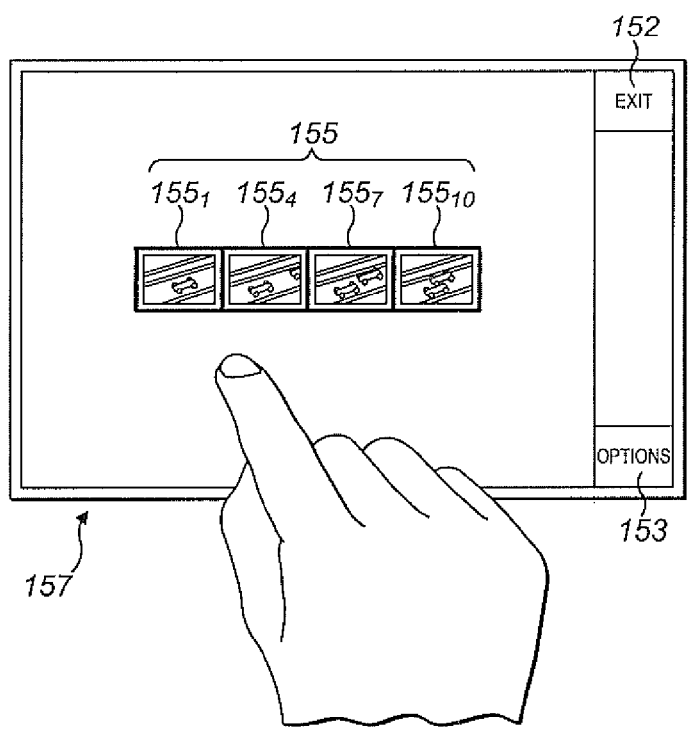

In the screenshot 157 shown in FIG. 5d, a new video or set of images has been generated including only the parts associated with the four key frames/images $155_1$, $155_4$, $155_7$, $155_1$.

The terminal 100 may also provide the user with various options in relation to the new video or set of images. For example, the user may be able to edit the new video or set of images in a similar way to that described above in relation to the original video. The user may be able to add or edit transition effects between different parts of the video. The user may be able to view the new video or set of images, save the new video or set of images to memory 112, or share the new video or set of images via a choice of communication means.

Alternatively or additionally, the user may be able to perform a different input at step S17 and a different action may be performed at step S18.

For example, the user may be able to perform an input in response to which the terminal 100 causes the part of a video or the sub-set of the set of images associated with a particular key frame/image 155 to be played back or displayed as a slide show. This input may involve carrying out a long press in relation to the key frame/image 155 and then selecting from a displayed list of options.

Other options may also be provided, for example, for deleting the part of the content associated with a particular key frame/image 155 or for deleting all other parts. An option for re-ordering the parts of the content, for example by dragging the associated key frames/images 155 across the display 102, may also be provided. An option for editing a particular part of the content, e.g. a particular set of video frames or images, for example by adding text or other effects may also be provided.

At step S19, the terminal 100 determines whether the 'exit' icon 152 has been selected. If not, then the operation returns to step S12. If so, then the terminal 100 takes steps to stop operation of the viewing/editing module 133. The terminal 100 may require the user to confirm that he/she wishes to exit and also prompt the user to save any unsaved changes to the content or to confirm that he/she do not wish to save the changes.

At step S20, the operation ends.

FIGS. 5a to 5d are example screenshots representing different stages of operation of the terminal 100.

Figure 4:
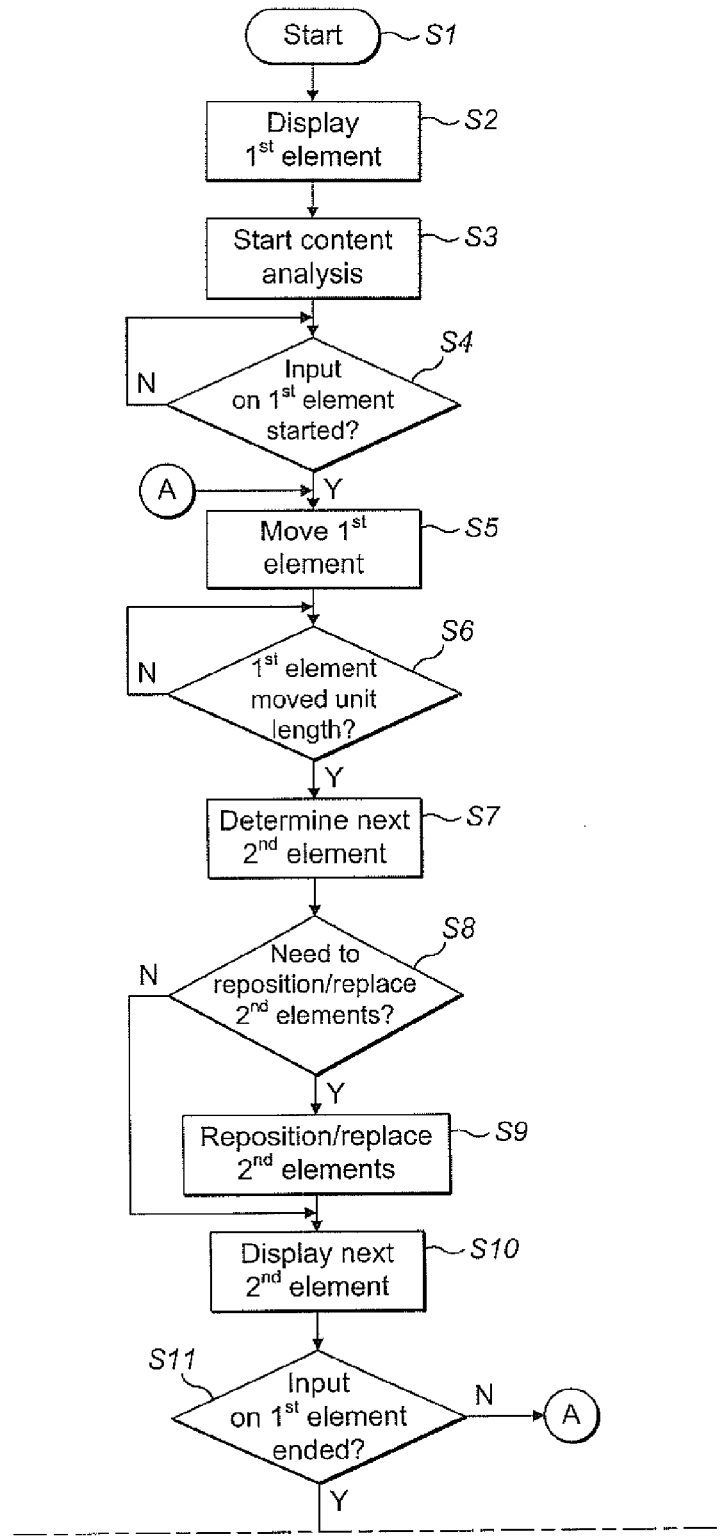
FIG. 4 is a flow diagram indicating the main functional steps performed during the viewing and/or editing.
Figure 4:
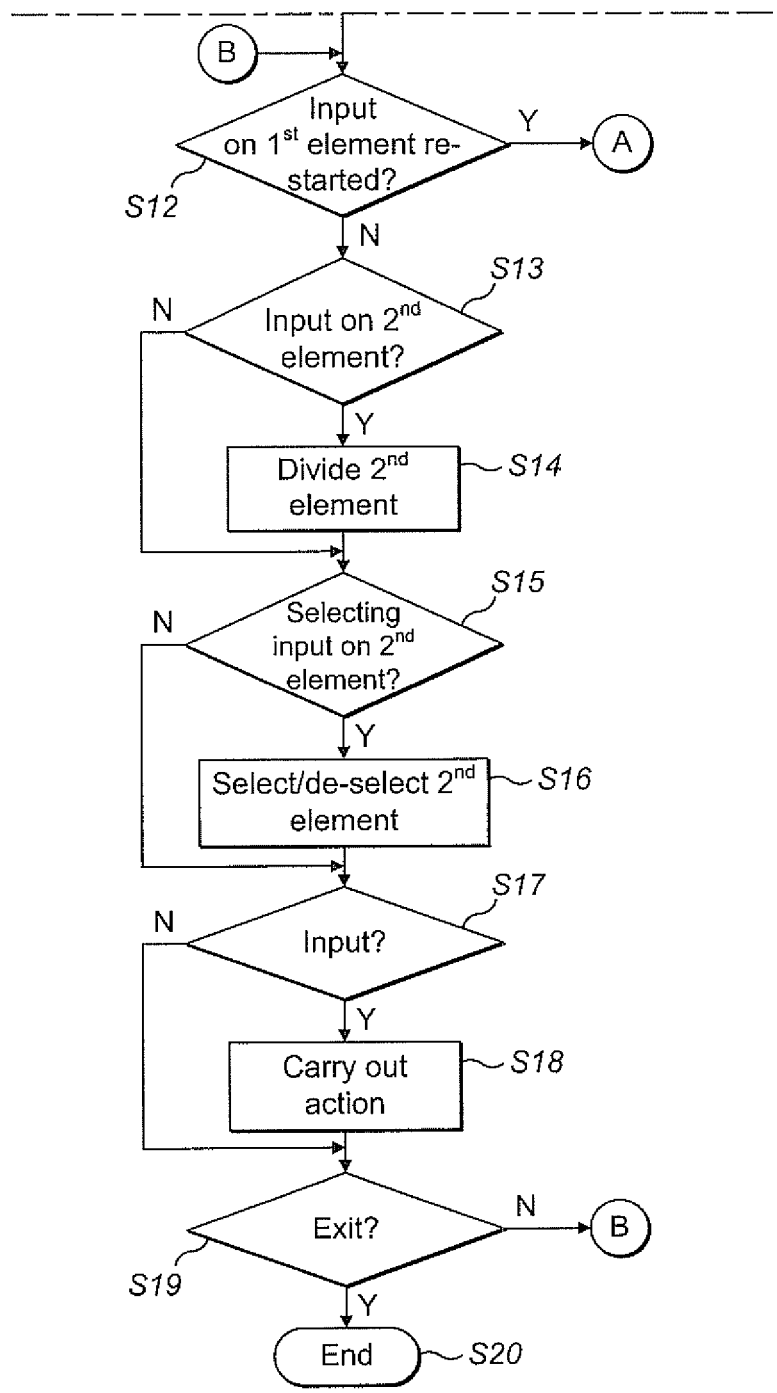

FIG. 5a shows a screenshot 150 which may be displayed at an early stage (see step S2 in FIG. 4) before the content has been divided, or at a later stage after any key frames/images 155 which have been added have been removed or after an option to restart the editing has been selected. The single icon 151 shown on the screen may be a generic icon accompanied by text related to the content, for example its file name. The icon 151 is shown towards the top right corner of the display 102. Thus, there is space on the display 102 in which the icon 151 can be moved. The display 102 is shown in a landscape orientation. However, the operation described above is similar when the display 102 is in a portrait orientation. In this case, the number of key frames/images 155 per line and the number of lines on the display 102 may be different.

FIG. 5b shows a screenshot 154 in which the user is performing the input in relation to the icon 151 (see steps S4 to S10 of FIG. 4). Three key frames/images $155_1, 155_2, 155_3$ are fully displayed and a fourth key frame/image $155_4$ next to the icon 151 is partially displayed. Although not shown in the figure, each of the key frames/images 155 preferably includes an image. The key frames/images 155 are shown as touching each other. However, the key frames/images 155 may also be displayed with spaces between them.

FIG. 5c shows a screenshot 156 after the user has finished dividing the content (see steps S15 to S18 in FIG. 4). The content has been divided into twelve parts and the associated twelve key frames/images 155 are displayed on the screen. In this example, the maximum number of key frames/images 155 per line is five. However, this maximum number may be higher or lower than five. The user has selected four of the key frames/images $155_1, 155_4, 155_7, 155_{10}$ and these have been highlighted accordingly.

In FIGS. 5b and 5c, the key frames/images 155 are labelled with an index that represents their relative position in the series of key frames/images 155. However, as described above, new key frames/images 155 may be added to the middle of the series of key frames/images 155. Thus, for example, the key frame/image labelled $155_3$ in FIG. 5b may not be the same as the key frame/image labelled $155_3$ in FIG. 5c.

FIG. 5d shows a screenshot after the user has generated new content, e.g. a new video or set of images, including only the four key frames/images $155_1, 155_4, 155_7, 155_{10}$ that were shown as being selected in FIG. 5c.

Thus, the above-described embodiments may have the benefit that content such as a video or a set of images can be easily and highly-controllably divided into a plurality of parts. These parts can then be viewed and/or edited, for example. The above benefits are particularly pronounced when the invention is implemented on an electronic device such as a mobile telephone, smart phone, personal digital assistant or tablet, although the principles may be applied to larger devices such laptop computers, desktop computers and suchlike.

Numerous alternative embodiments will be apparent to the skilled person, and all such embodiments that fall within the scope of the claims are within the scope of this invention. Some alternative embodiments will now be described.

The above-described embodiments may involve a single icon 151. Instead, in some embodiments, two or more icons, each of which is associated with different content, may be displayed and moved in order to display the key frames/images associated with parts of the different content. Thus, for example, the user may be able to generate a new video including a mix of parts from two videos.

Although in the above videos may be divided into parts based upon a 'difference' score and sets of images may be divided into parts based upon their visual content or other characteristics, these are just examples. The videos or sets of images may instead be divided into parts using any other suitable method. In some embodiments, videos may be divided into parts having particular durations dependent upon the total length of the video and the number of key frames 155 to be displayed. In some embodiments, sets of images may be divided into parts having particular numbers of images therein.

In the above-described embodiments, the terminal 100 may cause the icon 151 to move in response to the input in relation to it. However, the icon 151 does not need to move nor indeed to be displayed at all. Instead, in some embodiments, new key frames/images 155 may be displayed in direct response to an input such as a sliding input across the screen.

Although in the above the inputs for dividing the content and sub-dividing the parts of the content are described as being preferably continuous sliding inputs, this is just an example. The inputs may instead be performed in any other suitable way. For instance, the input may involve selecting a destination point on the display 102 for the icon 151 or the key frame/image 155.

Furthermore, in some embodiments, the inputs may be performed without using the touch sensitive display 102. For example, the inputs may be performed using the hardware keys 104. In some embodiments, the terminal 100 may not even have a touch sensitive display 102.

Although in the above the screenshots are described as being provided on the display 102, this is just an example. The screenshots may instead be projected by a projector (not shown) forming part of the terminal 100 or provided as part of a peripheral device to the terminal 100. With the use of such projection, the display 102 may be temporarily disabled, or images may be provided on the display 102 and be projected simultaneously.

Any two or more of the parts of the functional components may be combined, in which case operations said to be performed by the separate parts are performed by the combined parts.

It will be appreciated that the above described embodiments are purely illustrative and are not limiting on the scope of the invention. Other'variations and modifications will be apparent to persons skilled in the art upon reading the present application.

For instance, although the above relates to images or video content, similar operations could be performed in relation to other content, such as audio.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. An apparatus comprising at least one processor and at least one memory, the memory having computer-readable code stored therein which when executed causes the at least one processor to perform:

causing a first element to be displayed, the first element being associated with content that comprises at least one of video content or image content, the video content comprising a plurality of parts each having a plurality of frames, wherein at least one, but not all, of the video frames of each part of the video content is a key frame, the image content comprising a plurality of parts each having a plurality of images, wherein at least one, but not all, of the images of each part of the image content is a key image;

in response to an input in relation to the first element, causing a plurality of second elements to be displayed, each second element being associated with one of the plurality of parts of the content and being either one of the key frames of the video content or one of the key images of the image content, wherein a number of the plurality of second elements is dependent upon a property of the input, wherein the plurality of parts associated with the displayed second elements together constitute the content, and wherein causing the plurality of second elements to be displayed comprises causing the number of second elements to increase successively;

determining a next second element to be displayed by determining a next division of the content based upon one or more characteristics of the content;

displaying the next second element in an appropriate position in relation to the other displayed second elements; and in response to an input in relation to one or more of the plurality of second elements, carrying out an action.

2. The apparatus of claim 1, wherein:
the input comprises a sliding input; and
causing the plurality of second elements to be displayed comprises causing the number of second elements to increase as the length of the sliding input along a defined path increases.

3. The apparatus of claim 1, wherein the computer-readable code when executed causes the at least one processor to perform:
determining the plurality of parts of the content based upon one or more characteristics of the content.

4. The apparatus of claim 1, wherein causing the plurality of second elements to be displayed comprises causing the second elements to be displayed along a defined path, wherein an order of the second elements on the defined path corresponds to an order of the associated parts of the content.

5. The apparatus of claim 4, wherein the defined path comprises a plurality of parts, each part being arranged along a first direction and each part except the first part being offset from the preceding part in a second direction that is perpendicular to the first direction.

6. The apparatus of claim 1, wherein the computer-readable code when executed causes the at least one processor to perform:
causing the first element to move along a defined path in accordance with the input in relation to the first element.

7. The apparatus of claim 1, wherein the computer-readable code when executed causes the at least one processor to perform:
in response to a further input in relation to one of the plurality of second elements, causing a plurality of further second elements to be displayed, each further second element associated with one of a plurality of subparts of the part of the content which is associated with the second element, wherein the number of further second elements is dependent upon a property of the further input in relation to the second element.

8. The apparatus of claim 1, wherein carrying out the action comprises:
selecting one or more of the plurality of second elements; and
generating further content consisting of the parts associated with the selected one or more second elements.

9. A method comprising:
causing a first element to be displayed, the first element being associated with content that comprises at least one of video content or image content, the video content comprising a plurality of parts each having a plurality of frames, wherein at least one, but not all, of the video frames of each part of the video content is a key frame, the image content comprising a plurality of parts each having a plurality of images, wherein at least one, but not all, of the images of each part of the image content is a key image;

in response to an input in relation to the first element, causing a plurality of second elements to be displayed, each second element being associated with one of the plurality of parts of the content and being either one of the key frames of the video content or one of the key images of the image content, wherein a number of the plurality of second elements is dependent upon a property of the input, wherein the plurality of parts associated with the displayed second elements together constitute the content, and wherein causing the plurality of second elements to be displayed comprises causing the number of second elements to increase successively;

determining a next second element to be displayed by determining a next division of the content based upon one or more characteristics of the content;

displaying the next second element in an appropriate position in relation to the other displayed second elements; and in response to an input in relation to one or more of the plurality of second elements, carrying out an action.

10. The method of claim 9, wherein:
the input comprises a sliding input; and
causing the plurality of second elements to be displayed comprises causing the number of second elements to increase as the length of the sliding input along a defined path increases.

11. The method of claim 9, further comprising:
determining the plurality of parts of the content based upon one or more characteristics of the content.

12. The method of claim 9, wherein causing the plurality of second elements to be displayed comprises causing the second elements to be displayed along a defined path, wherein the order of the second elements on the defined path corresponds to an order of the associated parts of the content.

13. The method of claim 12, wherein the defined path comprises a plurality of parts, each part being arranged along a first direction and each part except the first part being offset from the preceding part in a second direction that is perpendicular to the first direction.

14. The method of claim 9, further comprising:
causing the first element to move along a defined path in accordance with the input in relation to the first element.

15. A non-transitory computer-readable storage medium having stored thereon computer-readable code, which, when executed by a computing apparatus, causes the computing apparatus to perform:
causing a first element to be displayed, the first element being associated with content that comprises at least one of video content or image content, the video content comprising a plurality of parts each having a plurality of frames, wherein at least one, but not all, of the video frames of each part of the video content is a key frame, the image content comprising a plurality of parts each having a plurality of images, wherein at least one, but not all, of the images of each part of the image content is a key image;

in response to an input in relation to the first element, causing a plurality of second elements to be displayed, each second element being associated with one of the plurality of parts of the content and being either one of the key frames of the video content or one of the key images of the image content, wherein a number of the plurality of second elements is dependent upon a property of the input, wherein the plurality of parts associated with the displayed second elements together constitute the content, and wherein causing the plurality of second elements to be displayed comprises causing the number of second elements to increase successively;

determining a next second element to be displayed by determining a next division of the content based upon one or more characteristics of the content;

displaying the next second element in an appropriate position in relation to the other displayed second elements; and in response to an input in relation to one or more of the plurality of second elements, carrying out an action.

* * * * *